(12) United States Patent
Mall

(10) Patent No.: US 9,186,738 B2
(45) Date of Patent: Nov. 17, 2015

(54) METHOD AND DEVICE FOR MACHINING WORK PIECES THAT ROTATE AROUND A WORK PIECE AXIS

(75) Inventor: Johann Mall, Fuerstenfeldbruck (DE)

(73) Assignee: THE GLEASON WORKS, Rochester, NY (US)

( * ) Notice: Subject to any disclaimer, the term of this patent is extended or adjusted under 35 U.S.C. 154(b) by 2042 days.

(21) Appl. No.: 12/215,142

(22) Filed: Jun. 25, 2008

(65) Prior Publication Data

US 2009/0007735 A1  Jan. 8, 2009

(30) Foreign Application Priority Data

Jul. 4, 2007  (DE) .......................... 10 2007 030 955

(51) Int. Cl.
*B23F 23/04* (2006.01)
*B23F 23/06* (2006.01)
*B23Q 7/04* (2006.01)
*B23F 19/05* (2006.01)

(52) U.S. Cl.
CPC ................. *B23F 23/04* (2013.01); *B23F 19/05* (2013.01); *B23Q 7/04* (2013.01); *Y10T 82/2511* (2015.01)

(58) Field of Classification Search
USPC ............ 82/117, 124–127; 29/27 R, 27 C, 28; 483/18–20; 451/47, 253, 385, 397, 451/398, 451
IPC ....................................................... B23F 23/04
See application file for complete search history.

(56) References Cited

U.S. PATENT DOCUMENTS

| 2,379,210 | A | * | 6/1945 | Alyea .......................... 279/2.14 |
| 2,910,919 | A | * | 11/1959 | Rye .................................. 409/6 |
| 3,095,782 | A | * | 7/1963 | Skalsey ............................ 409/7 |
| 3,678,790 | A | * | 7/1972 | Riley ............................. 82/162 |
| 3,744,125 | A | * | 7/1973 | Schalles ......................... 483/20 |
| 4,316,398 | A | * | 2/1982 | Link et al. ..................... 82/125 |
| 4,546,681 | A | * | 10/1985 | Owsen ........................... 82/162 |

(Continued)

FOREIGN PATENT DOCUMENTS

| DE | 3701504 A1 | 7/1987 |
| DE | 3940759 | 6/1991 |

(Continued)

OTHER PUBLICATIONS 61-293749A partial English traslation, Matsumoto, 1986, p. 1.*

(Continued)

*Primary Examiner* — Sunil K Singh
*Assistant Examiner* — Sara Addisu
(74) *Attorney, Agent, or Firm* — Robert L. McDowell

(57) ABSTRACT

Device for machining work pieces rotating around a work piece axis (Z) with a tool that rotates around a tool axis, where a clamping device (9) is transferred into a first position, a work piece to be machined is clamped on said clamping device, the clamping device (9) with the work piece clamped thereon is transferred from the first position into a spatially separated second position where it can be driven to rotate around the work piece axis (Z) by a work piece spindle (1) connected to the clamping device (9) and after the work piece has been machined, the clamping device (9) is transferred from the second into the first position, wherein the clamping device (9) is separated from the work piece spindle (1) in the transfer from the second into the first position, and connected to the work piece spindle (1) in the transfer from the first into the second position (FIG. 1).

10 Claims, 4 Drawing Sheets

(56) References Cited

U.S. PATENT DOCUMENTS

| | | | |
|---|---|---|---|
| 4,646,422 A * | 3/1987 | McMurtry | 483/1 |
| 4,706,371 A * | 11/1987 | McMurtry | 483/14 |
| 5,031,490 A * | 7/1991 | Grossmann | 82/124 |
| 5,081,889 A * | 1/1992 | Takano et al. | 82/122 |
| 5,222,285 A * | 6/1993 | Horikawa | 29/33 P |
| 5,787,771 A * | 8/1998 | Ogawa et al. | 82/1.11 |
| 6,219,893 B1 * | 4/2001 | Nordquist | 29/33 P |
| 6,565,418 B1 | 5/2003 | Feisel | |
| 6,840,720 B2 * | 1/2005 | Mall | 409/8 |
| RE40,690 E * | 3/2009 | Haninger et al. | 414/225.01 |
| 7,597,035 B2 * | 10/2009 | Rehm | 82/157 |
| 7,682,223 B2 * | 3/2010 | Wirz et al. | 451/11 |
| 2002/0107122 A1 * | 8/2002 | Hoppe | 483/46 |
| 2004/0040424 A1 * | 3/2004 | Smith et al. | 82/124 |
| 2008/0271304 A1 * | 11/2008 | Grossmann | 29/561 |
| 2009/0007735 A1 * | 1/2009 | Mall | 82/122 |
| 2011/0132594 A1 * | 6/2011 | Slack | 166/77.51 |
| 2011/0177925 A1 * | 7/2011 | Mayr et al. | 483/14 |
| 2013/0095988 A1 * | 4/2013 | Mayr et al. | 483/58 |

FOREIGN PATENT DOCUMENTS

| | | | |
|---|---|---|---|
| DE | 3940759 A1 | | 6/1991 |
| DE | 19857592 A1 | | 6/2000 |
| EP | 1402991 | | 3/2004 |
| EP | 1591194 | | 11/2005 |
| JP | 58192703 A | * | 11/1983 |
| JP | 59019616 A | * | 2/1984 |
| JP | 59201709 A | * | 11/1984 |
| JP | 61-293749 A | | 12/1986 |

OTHER PUBLICATIONS

Official Action from German Patent Office for DE 10 2007 030 955.6 (with English translation), Feb. 15, 2008.

Patent Abstracts of Japan for JP 61-293749 published Dec. 24, 1986, Nikken Kosakusko KK.

Extended European Search Report and Written Opinion for EP 08 008 861.0 with English translation.

* cited by examiner

METHOD AND DEVICE FOR MACHINING WORK PIECES THAT ROTATE AROUND A WORK PIECE AXIS

This application claims the benefit of German Patent Application No. 10 2007 030 955.6 filed Jul. 4, 2007.

FIELD OF THE INVENTION

The invention relates to a method for machining work pieces that rotate around a work piece axis, using a tool that rotates around a tool axis, where a clamping device is transferred into a first position, a work piece to be machined is clamped onto said clamping device, the clamping device with the work piece clamped thereon are transferred from the first position into a spatially separate second position where it can be driven by a work piece spindle connected to the clamping device to rotate around the work piece axis, and after the work piece has been machined, the clamping device is transferred from the second into the first position, as well as a device for carrying out said method.

BACKGROUND OF THE INVENTION

In a known method of the type described above, where the work pieces are gear wheels and the tool is a grinding worm to cut the teeth of the gear wheels (DE 198 57 592 A1), the clamping device is an inseparable component of the work piece spindle. Consequently, the work piece spindle, its power steering, and a carriage that guides it along a machining axis must be moved back and forth between the first and the second position. This requires a relatively high structural effort with the device used for performing the method. The structural effort is further increased because a second work piece spindle with power steering and guide carriage is required, since the loading of work pieces in the first position and the machining of work pieces from the second position is performed in a time overlap to shorten the machining times.

The object of the invention is to create a method and a device of the type described above which require less structural efforts.

The object of the invention is attained with a method where the clamping device is separated from the work piece spindle when it is transferred from the second position into the first position, and is connected with the work piece spindle when it is transferred from the first into the second position.

SUMMARY OF THE INVENTION

Thus, in the method according to the invention, the connection between the work piece spindle and the clamping device loaded with the work piece to be machined is therefore achieved only after the clamping device is transferred into its second position. In this connected state, the clamped work piece can be rotationally driven by the work piece spindle around the work piece axis. If a movement along a machining axis is required for the machining action between the clamped work piece and the tool, the work piece spindle can be arranged on a carriage that can move along said machining axis, with the machining axis being aligned parallel to the work piece axis, for example. The movement of the work piece spindle along said machining axis may be required, in particular in the honing, grinding, scraping or cutting of gears, relative to the tool that rotates around the tool axis, which in the aforementioned cases may be a honing wheel, a grinding worm, a grinding disk, a shaving cutter or a hobbing cutter. After the machining, the clamping device is separated from the work piece spindle in its second position and transferred into the first position for exchanging the machined work piece for a work piece to be machined, the work piece spindle remains in place and does not have to be transferred.

With respect to the device, the object of the invention is attained with a device for machining work pieces that rotate around a work piece axis, with a tool that can be rotationally driven around a tool axis, a clamping device on which a work piece can be clamped in a first position of the clamping device, and a transfer device that can transfer the clamping device from the first position into a spatially separate second position, where it can be rotationally driven around the work piece axis by a work piece spindle that is connected to the clamping device.

DETAILED DESCRIPTION OF THE INVENTION

The description below describes the invention in greater detail with an embodiment of the device according to the invention with reference to the illustrations which represent the invention by way of example only.

Figure 1:
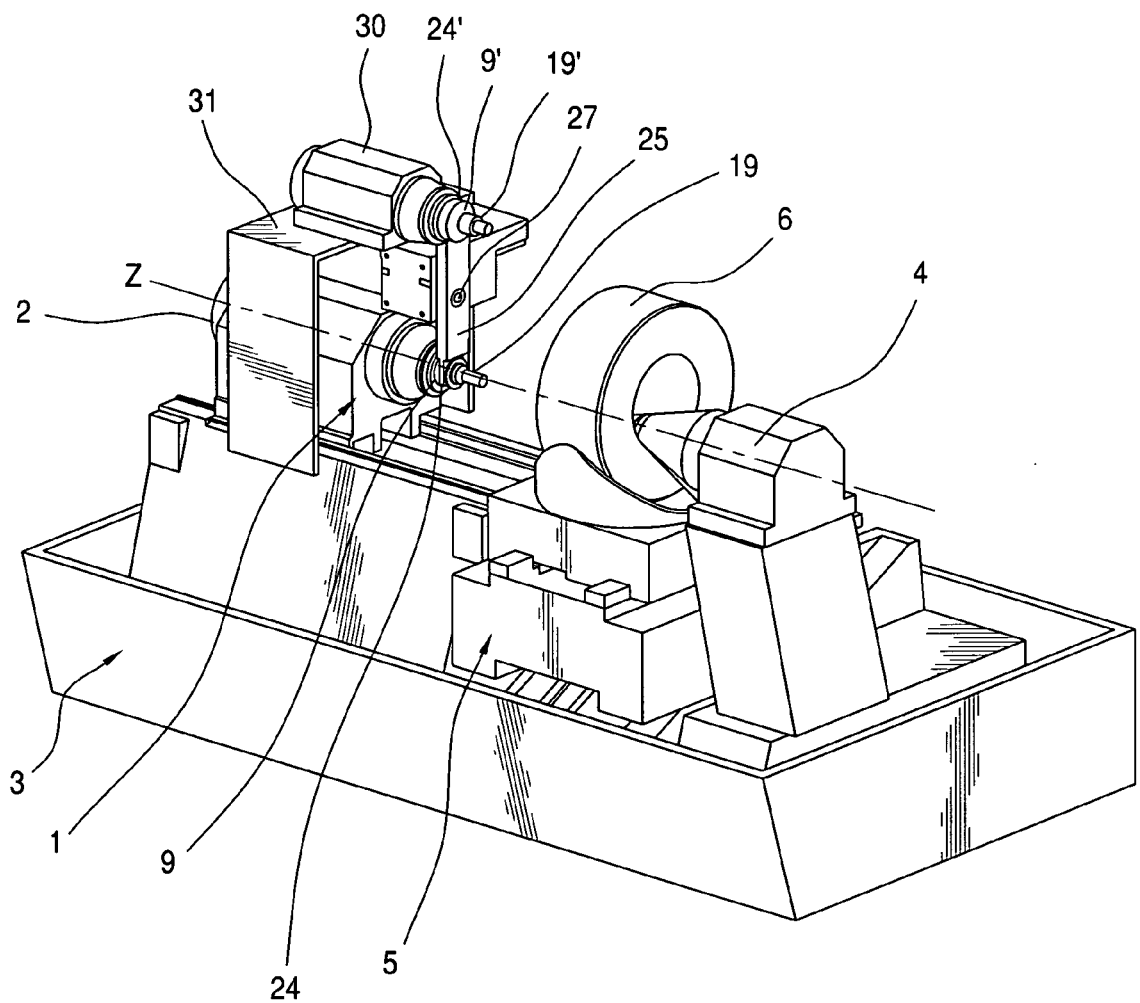
FIG. 1 illustrates a schematic representation of a gear wheel honing machine in perspective view.

According to FIG. 1, the gearwheel honing machine has a work piece spindle 1 that is rotationally driven by a servo drive and has a horizontally running axis of rotation Z. The work piece spindle 1 is arranged on a carriage 2 which can be displaced on a machine frame 3 of the gear wheel honing machine by a servo drive along a machining axis parallel to the axis of rotation Z. Furthermore, a tailstock 4, which is aligned with the axis of rotation Z and can move parallel to the direction of the axis of rotation 4, is arranged on the machine frame 3.

A tool head 6 is arranged between the work piece spindle 1 and the tailstock 4 on a carriage arrangement 5 and can be moved by the carriage arrangement 5 on an orthogonal level relative to the axis of rotation Z along any movement paths. Furthermore, the tool head 6 is supported on the carriage arrangement around an orthogonal axis with angular adjustment facility and may have a servo drive to adjust the angle. In the tool head 6, the honing wheel of the gear wheel honing machine is supported in a rotationally driven fashion, with a rotational drive that is not shown in FIG. 1.

Figure 2:
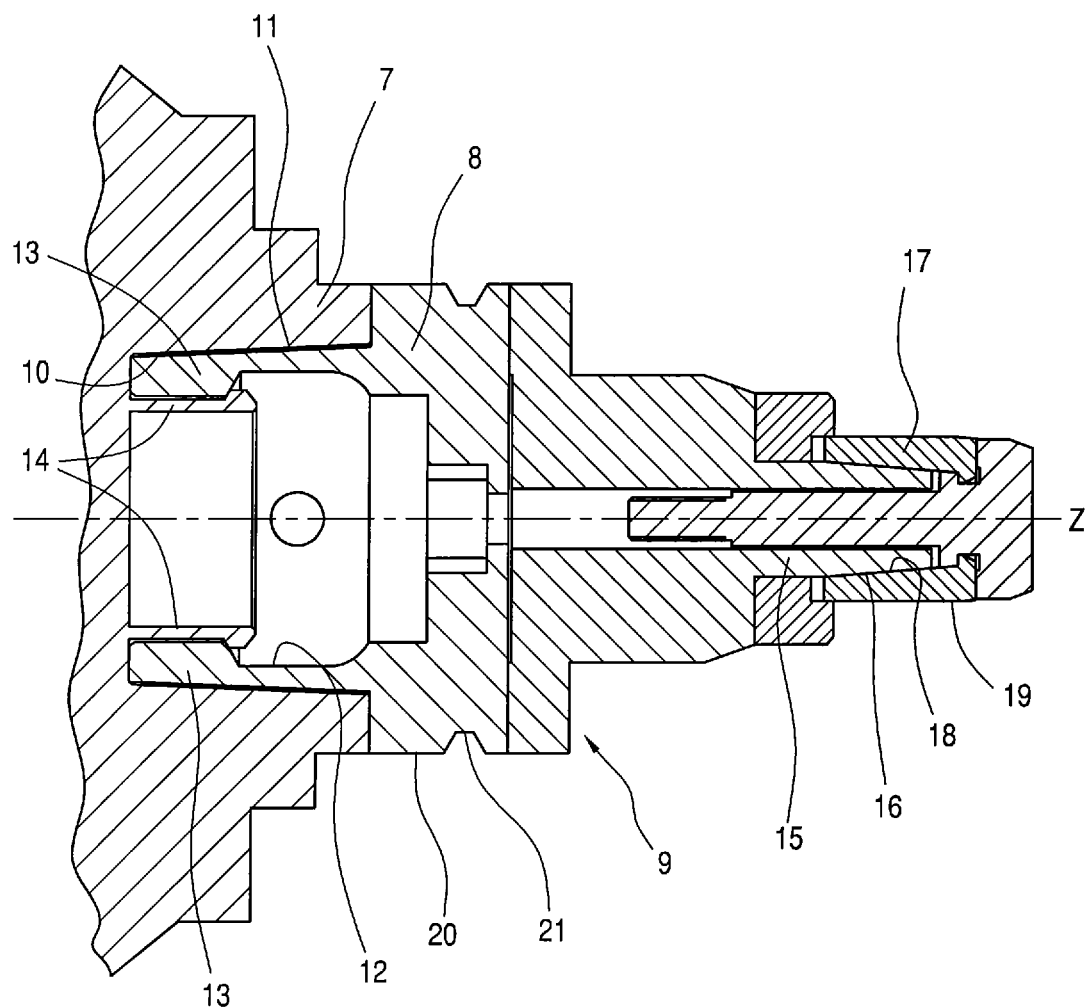
FIG. 2 shows an axial section of the connection between a clamping device and a work spindle in the gear wheel honing machine shown in FIG. 1.

According to FIG. 2, the work piece spindle 1 has on its axial end in direction to the tool head 6 a first connection segment 7, which can be connected to a complementary second connection segment 8 of a clamping device 9 in a separable fashion. Specifically, the first connection segment 7 has an interior surface area 10 that is coaxial to the axis of rotation Z and shaped like a truncated cone casing, which conically enlarges in the direction of the clamping device 9. The second connection segment 8 has an external surface area 11 shaped like a truncated cone casing, which complements the interior surface area 10 and forms a snug fit with the surface area 10 in the connected state shown in FIG. 2.

Radial inward facing axial projections 13 are formed on an interior side 12 of the second connecting segment located radially inward of the exterior surface area 11, which when viewed in the direction of the circumference form areas that diverge from the rotation symmetry. In the connected state shown in FIG. 2, these axial projections 13 are supported in the direction of the circumference on complementary sliding blocks, which are disposed in a non-rotatable fashion at the connection segment 7 of the work piece spindle 1 (not shown in FIG. 2). This determines the angular position of the clamping device 9 relative to the work piece spindle 1.

The axial end of the clamping device 9 opposite the second connecting segment 8 has a coaxial clamping cone 15 relative to the axis of rotation Z, and arranged on the truncated cone-shaped exterior surface area 16 of said clamping cone is an expansion sleeve 17 with an interior lateral surface area 18 in the shape of a truncated cone, which complements the exterior surface area 16. With this arrangement the expansion sleeve 17 can be adjusted with a relative radial movement between the latter and the clamping cone 15 between a contracted radial state and an expanded radial state. Instead of the clamping cone 15, other means known to one skilled in the art may be provided to enlarge or reduce the radius of the expansion sleeve.

The expansion sleeve 17 has a cone-shaped lateral exterior surface 19 which is co-axial to the axis of rotation Z and is inserted into a boring coaxial to the work piece axis when the work piece is clamped, and which in axially contracted state non-positively fits the cone-shaped inner lateral surface of said boring. Thus, the axis of rotation Z and the work piece axis correspond.

Figure 3:
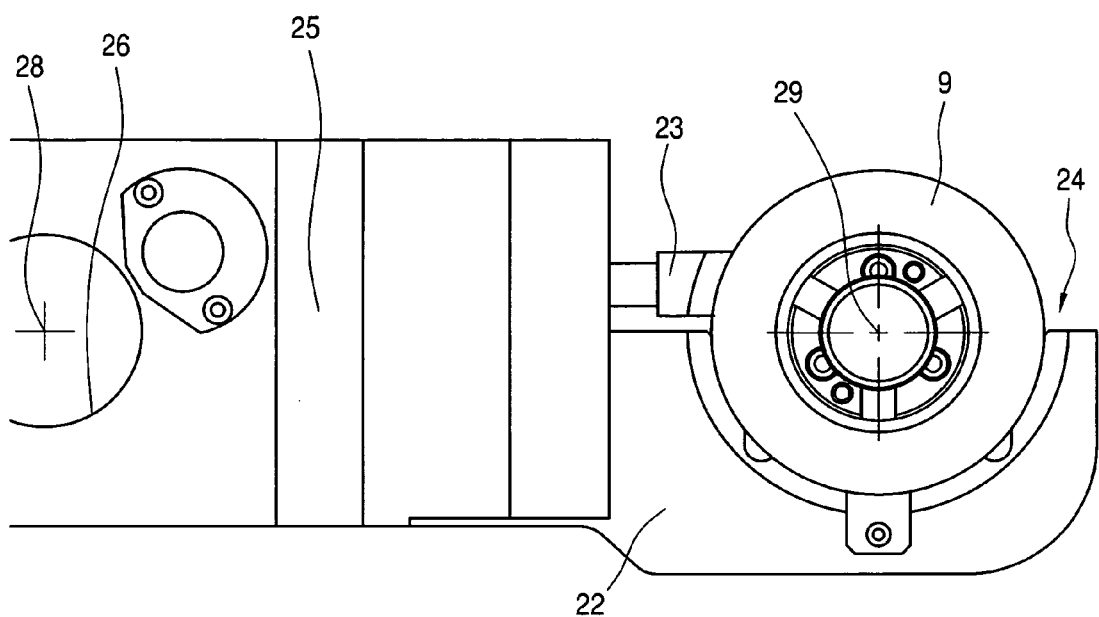
FIG. 3 is an enlarged view of a gripper of the gear wheel honing machine shown in FIG. 1 in its closed position.
Figure 4:
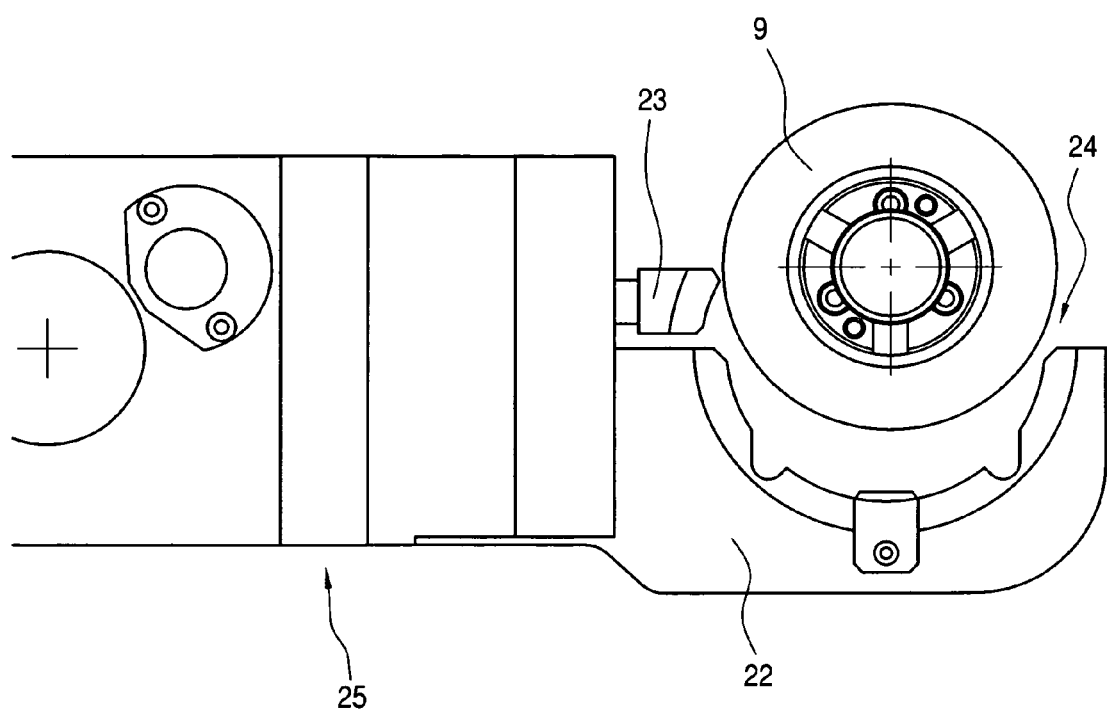
FIG. 4 illustrates a view of the gripper corresponding to FIG. 3 in an open position.

A circumferential groove 21 which is coaxial relative to the axis of rotation Z and has a cross-section that opens outward in the shape of a V, is developed in a cylindrical area 20 of the external circumference of the clamping device 9 located between the expansion sleeve 17 and the second connecting segment 8. Said circumferential groove can engage complementary grip fingers 22, 23 of a gripper 24 shown in FIG. 3. As shown in particular in FIG. 4, the one grip finger 22 is fixedly arranged at a free end of a support 25, whereas the other grip finger 23 can controllably move between an open position shown in FIG. 4 and a closed position shown in FIG. 3. FIG. 3 and FIG. 4 furthermore show that the grip finger 22 can engage in the circumferential groove 21 of the clamping device 9 approximately along half its circumferential length, whereas the movable grip finger 23 engages in the remaining circumferential half of the circumferential groove 21 in the closed position, where it is advanced in the direction of the clamping device 9 in the grip finger 22, and thus effects a tight fit of the clamping device 9 in the gripper 24.

FIG. 2 and FIG. 4 only show an end of the support 25 with the gripper 24 as well as a segment of said support that runs from said end to an axial boring 26. FIG. 1 shows that the support 25 is symmetrical to the axial boring 26 and has on its other end a gripper 24' that corresponds to the gripper 24. FIG. 1 furthermore shows that the support 25 and its axial boring 26 are fixed on an actuation shaft 27 that is axially parallel relative to the work piece axis, with the axial distance between the actuation shaft 27 and the work piece axis Z corresponding to the distance between the center 28 of the axial boring 26 shown in FIG. 3 and the center 29 of the clamping device 9 engaged by the gripper 24.

In the axial distance, an indexing spindle 30 is arranged axially parallel relative to the work piece axis Z on a fixed machine frame console 31 diametrically to the clamping device 9 connected to the work piece spindle 1, and has a connecting segment for a separable connection to the second connecting segment 8 of the clamping device 9 which is identical to the first connecting segment 7 of the work piece spindle 1.

The gear wheel honing machine is operated as follows. When machining a gear wheel that is clamped on the clamping device 9 connected to the work piece spindle 1, the support 25 with the grippers 24, 24' is pivoted in a resting position relative to its position shown in FIG. 1 by an appropriate clockwise 90° rotation of the actuation shaft 27. Furthermore, the carriage 2 is displaced into the direction of the tool head 6 far enough so that the gear wheel clamped on the clamping device 9 is in contact with the honing ring in the machining engagement within the tool head 6. At the same time, an additional clamping device 9', which is identical to the clamping device 9, is connected with the indexing spindle 30 and loaded by a work piece changing device (not shown), which slides a gear wheel to be machined on the outer surface 19' of the expansion sleeve of said clamping device 9'. After the gear wheel to be machined has been clamped on the clamping device 9', the latter is rotated by the indexing spindle 30 under the control of a suitable controlling device into an angle position suitable for the machining engagement with the honing wheel.

When the machining of the gear wheel on the clamping device 9 connected to the work piece spindle 1 is completed in the machining head 6, the carriage 2 that supports the work piece spindle 1 returns to its work piece changing position shown in FIG. 1. In said position, the clamping device 9 connected to the work piece spindle 1 is in a spatially different second position relative to the first position assumed by the clamping device 9' connected with the indexing spindle 30, where the circumferential groove 21 of the clamping device 9 and the circumferential groove 21 of the clamping device 9' are superimposed in an orthogonal plane relative to the work piece axis Z.

In this state, the support 25 is pivoted around the actuation shaft 27 counter-clockwise by 90° with a rotation, with its two grippers 24, 24' being controlled into the open position shown in FIG. 4. In this way, the grippers 24, 24' engage at the circumferential grooves 21 of the clamping devices 9 and/or 9' and are controlled into the closed position shown in FIG. 3.

In this state, the support 25 and the grippers 24, 24' engaging at the clamping devices 9, 9' are displaced far enough parallel to the axis of rotation Z to separate the connection between the tool spindle 1 and its clamping device 9 as well as the indexing spindle 30 and its clamping device 9' shown in FIG. 2. Then the actuation shaft 27 is rotated appropriately to pivot the support 25 by 180° so that the clamping device 9 with the indexing spindle 30 and the clamping device 9' with the work piece spindle 1 are in axial alignment. A subsequent axial displacement of the support 25 then leads to the connection between the work piece spindle 1 and the clamping device 9' as well as the connection between the clamping device 9 and the indexing spindle 30 in the manner shown in FIG. 2. In this way, the clamping device 9' was transferred from the first position into the second position and the clamping device 9 was transferred from the second position into the first position.

In this state, the gear wheel supplied to be machined, which was supplied previously by the work piece changing device, is on the clamping device 9' connected to the work piece spindle 1, whereas the gear wheel machined in the tool head 6 is on the clamping device 9 connected to the indexing spindle 31.

In this state, the grippers 24, 24' are controlled into their open position and then the support 25 is pivoted by 90° into its previously discussed resting position. The work piece changing device then exchanges the machined gear wheel on the clamping device 9 connected to the indexing spindle 30 for a new gear wheel to be machined, and the cycle described above repeats itself continually until all work pieces in a series have been machined.

The drive for the pivot- and axial movement of the support 25 with the grippers 24, 24' discussed earlier is not shown in the illustration and can be realized with means known to one skilled in the art. Said drive, as well as the drives for all axes of movement, in particular the axes of rotation of the spindles 1, 30 and the linear movement axis of the carriage 2, are controlled by an electronic control means and thus the entire operation proceeds automatically.

Usefully, at least two clamping devices are provided, of which one is transferred from the first position into the second position, whereas the other is transferred from the second position into the first position. In particular, the method can be performed such a blank work piece is clamped on the clamping device in the first position in a timely overlap with the machining of a work piece that is clamped on the clamping device in the second position. With these measures, the machining speed is increased significantly in serial production because the work piece clamped into the clamping device connected to the work piece spindle is machined while the next work piece in the machining queue is loaded into the clamping device in the first position.

The scope of the invention provides in particular that in the first position, the clamping device is connected to an indexing spindle that corresponds to the connection between the clamping device and the work piece spindle and can be rotationally driven, which can be used to generate a signal that represents an angular position of the work piece clamped on said clamping device. With the help of said signal, the relative rotational position between the work piece clamped on said clamping device and the tool can be set as required for the machining with the tool after the clamping device has been transferred into the second position. This setting of the relative rotational position is preferred if the work piece is a gear wheel and the tool is a finishing tool, such as an annular-toothed honing gear or shaving gear or a grinding worm or a grinding disk. Setting the proper relative rotational position will ensure that the tool can enter a tooth gap to be machined without collision.

For the above indexing process, it is known that the gearing of the gear wheel to be machined is probed with a special, non-contact sensor and in reaction to the sensor signal, the signal that represents the angle position is generated in a control means programmed for that purpose. For example, in this way, the indexing spindle connected to the clamping device, or alternately the work piece spindle, can be rotated into the correct relative rotational position. In the embodiment according to the invention, the time needed for said indexing process is required in particular in the first position, and thus the machining process by the tool in the second position can start immediately without the time needed for the indexing.

A preferred embodiment of the method according to the invention provides that the separation or connection by means of a relative movement between the clamping device and the work piece spindle or the indexing spindle occurs along the respective spindle axis. Thus, in this case, the separation or connection occurs with a lifting movement parallel to the spindle axis, which removes the clamping device from the respective spindle, or slides it on the respective spindle.

Furthermore, it is preferred that the transfer of the clamping device between the first and the second position occurs along a pivoting movement around an axis of rotation parallel to the work piece axis. This pivoting movement moves the clamping device, which is separated from the respective spindle, between the first and second position along an arc of a circle.

LIST OF REFERENCE SYMBOLS 1 work piece spindle
Z axis of rotation/work piece axis
2 carriage
3 machine frame
4 tail stock
5 carriage arrangement
6 tool head
7 first connecting segment
8 second connecting segment
9, 9' clamping device
10 interior surface area
11 exterior surface area
12 interior side
13 axial projection
14 axial groove
15 clamping cone
16 exterior surface area
17 expansion sleeve
18 interior surface area
19, 19' exterior surface area
20 external circumference area
21 circumferential groove
22, 23 grip finger
24, 24' gripper
25 support
26 axial boring
27 actuation shaft
28 center
29 center
30 indexing spindle
31 console While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. Device for machining work pieces that rotate around a work piece axis (Z), with a tool that can be rotationally driven around a tool axis, a clamping device (9, 9') on which a work piece can be clamped, said clamping device clamping a workpiece prior to machining at a first position and releasing said work piece subsequent to machining in said first position (9, 9'), and a transfer device (25) which can transfer the clamping device (9, 9') from the first position into a spatially separated second position where it can be rotationally driven around the work piece axis (Z) during machining by a work piece spindle (1) that is connected to the clamping device (9), wherein the connection between the clamping device (9, 9') and the work piece spindle (1) has a first connecting segment (7) that is permanently fixed at the work piece spindle (1) and a complementary second connecting segment (8) that is permanently fixed at the clamping device (9, 9'), which can be separated and reconnected by a relative motion between the first connecting segment (7) and the second connecting segment (8).

2. Device in accordance with claim 1 characterized in that the relative motion for separating and reconnecting the first connecting segment (7) and the second connecting segment (8) is a linear movement parallel to the work piece axis (Z).

3. Device in accordance with claim 1 characterized in that the transfer device (25) has a gripper (24, 24') that can be engaged and disengaged at the clamping device (9, 9'), which transfers the clamping device (9, 9') between its first and second position.

4. Device in accordance with claim 3 characterized in that the gripper (24, 24') has two gripping fingers (22, 23) that complement a respective circumferential segment of the clamping device (9, 9') and can be moved relatively toward one another between an open position and a closed position, with the gripper (24, 24') being engaged at the clamping device (9, 9') in closed position and the gripper (24, 24') being disengaged in the open position.

5. Device in accordance with claim 3 characterized in that at least two clamping devices (9, 9') and at least two grippers (24, 24') are provided, of which one can engage at the clamping device in the first position, and the other at the other clamping device in the second position.

6. Device in accordance with claim 5 characterized in that the two grippers (24, 24') are arranged at an element (25) that can rotate around an axis (27) which is parallel to the work piece axis (Z), and that the rotation of said element transfers the one clamping device (9) engaged at its first position into the second position, and the other clamping device (9') engaged at its second position into the first position.

7. Device in accordance with claim 1 further including an indexing spindle (30) arranged at the first position, said indexing spindle having a connecting segment which is identical to said first connecting segment (7) of the work piece spindle.

8. Device in accordance with claim 1 characterized in that the clamping device (9, 9') has an expansion sleeve (17) that can be adjusted between a radially contracted state where the expansion sleeve (17) can be inserted into a work piece boring coaxial to the work piece axis (Z), and a radially expanded state, where the work piece is fixedly clamped on the expansion sleeve (17).

9. Device in accordance with claim 1 characterized in that the work piece spindle (1) is arranged on a carriage (2) that can move along a machining axis.

10. Device in accordance with claim 9 characterized in that the machining axis is parallel to the work piece axis (Z).

* * * * *